US007138145B2

(12) United States Patent
Walker et al.

(10) Patent No.: US 7,138,145 B2
(45) Date of Patent: Nov. 21, 2006

(54) METHOD AND APPARATUS FOR OZINATION OF GRAIN

(75) Inventors: Roland N. Walker, Idaho Falls, ID (US); Carl B. Taylor, Ida Falls, ID (US); Lynn F. Johnson, American Falls, ID (US); Phil W. Simpson, Idaho Falls, ID (US)

(73) Assignee: O3 Zone Co., Inc., Idaho Falls, ID (US)

( * ) Notice: Subject to any disclaimer, the term of this patent is extended or adjusted under 35 U.S.C. 154(b) by 0 days.

(21) Appl. No.: 10/943,389

(22) Filed: Sep. 17, 2004

(65) Prior Publication Data

US 2005/0112209 A1    May 26, 2005

Related U.S. Application Data

(63) Continuation-in-part of application No. 10/243,558, filed on Sep. 13, 2002.

(60) Provisional application No. 60/323,900, filed on Sep. 21, 2001.

(51) Int. Cl.
*A01N 59/00*    (2006.01)
*A23B 9/18*    (2006.01)
*A23L 3/3409*    (2006.01)

(52) U.S. Cl. .................. 424/613; 422/28; 422/31; 422/40; 426/312; 426/320; 426/335; 426/532

(58) Field of Classification Search ............... None
See application file for complete search history.

(56) References Cited

U.S. PATENT DOCUMENTS

| 4,549,477 A | 10/1985 | McCabe, Jr. ............... 99/477 |
| 5,707,594 A | 1/1998 | Austin .................. 422/186.3 |
| 5,858,435 A | 1/1999 | Gallo ...................... 426/320 |
| 5,946,919 A | 9/1999 | McKinney et al. ............ 62/3.7 |
| 6,086,833 A | 7/2000 | Conners et al. ............. 422/292 |
| 6,120,822 A | 9/2000 | Denvir et al. ............. 426/320 |
| 6,171,625 B1 | 1/2001 | Denvir et al. ............. 426/320 |

*Primary Examiner*—Sreeni Padmanabhan
*Assistant Examiner*—Frank I Choi

(74) *Attorney, Agent, or Firm*—Kirton & McConkie; Michael F. Krieger

(57) ABSTRACT

A method for treating grain comprising circulating concentrated ozone through an evenly distributed column of grain to maintain a concentration of between 50 and 100 ppm.

7 Claims, 1 Drawing Sheet

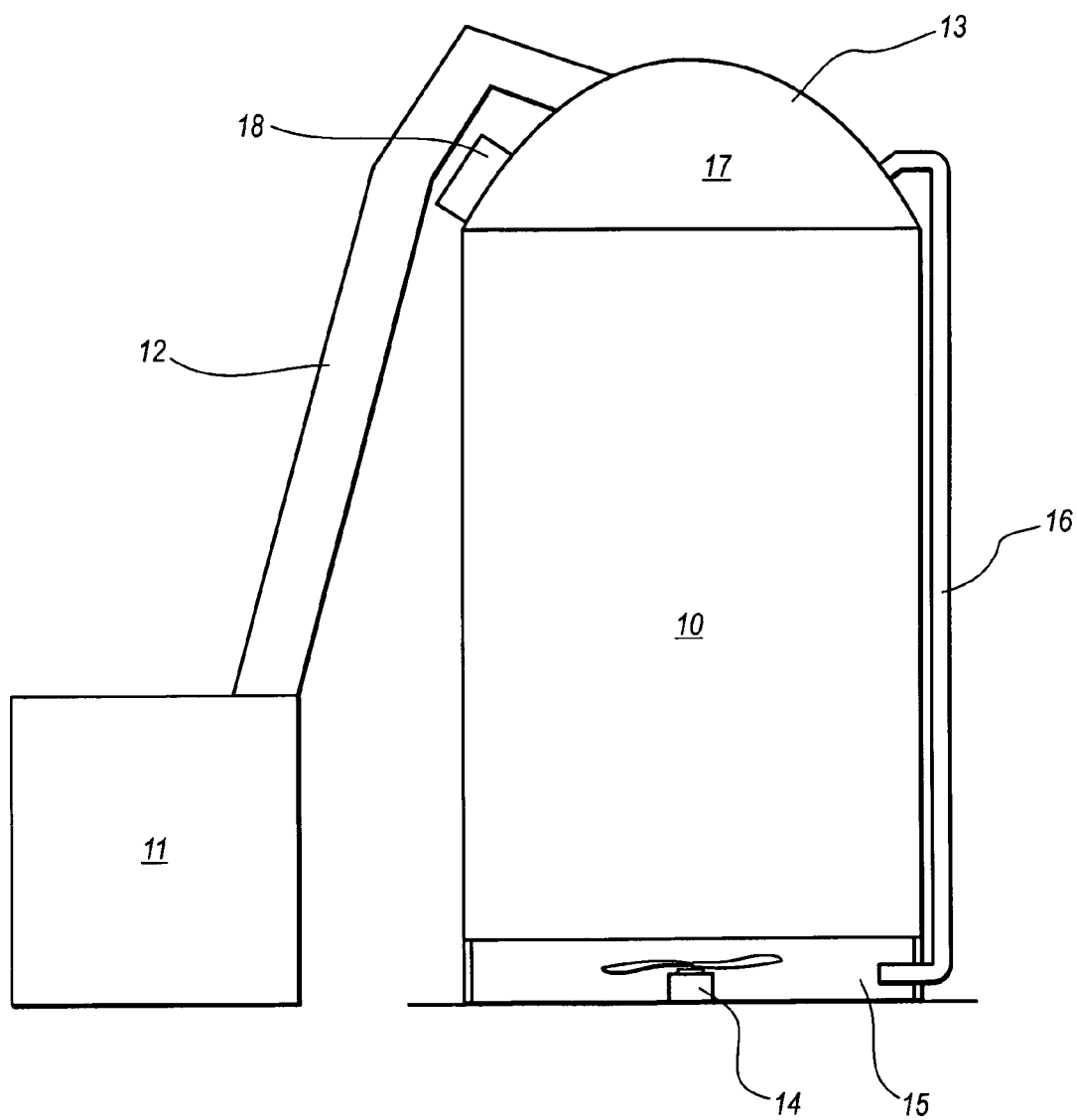

METHOD AND APPARATUS FOR OZINATION OF GRAIN

RELATED APPLICATIONS

This application is a continuation-in-part of co-pending U.S. application Ser. No. 10/243,558, filed Sep. 13, 2002, which claims priority to provisional application No. 60/323,900, filed Sep. 21, 2001.

BACKGROUND

Field of the Invention

Traditional methods for treating grain involve the fumigation of the grain with toxic chemicals such as phosphine and methyl bromide. Both of these fumigation techniques have been effective at killing insects, however, they do pose a danger to those who come in contact with the chemicals and they have not been effective in treating mold, fungus, and some bacteria that also infest the surface of grain.

BRIEF DESCRIPTION OF THE DRAWINGS

The FIGURE depicts a grain elevator incorporating the teachings of the present invention.

SUMMARY AND OBJECTS OF THE INVENTION

It is an object of some embodiments of the present invention to provide a method for treating grain for fungus, mold, bacteria, dust, and insects by exposing the grain to a high concentration of ozone for an extended period of time. The present invention utilizes a powerful fan or fans placed at the bottom of the grain storage facility such as, for example, a silo or grain elevator to draw down through the grain a flow of gas containing ozone between 50 and 100 ppm. Ozone generators placed in the head space at the top of the elevator produce ozone in a concentration in excess of 100 ppm. Monitors placed in this head space assure that the ozone concentration remains at these levels. If the ozone generators are not capable of maintaining the concentration at 100 ppm in the head space, then the draw is reduced by slowing the fan speed. A duct takes drawn gases from the bottom of the elevator and re-circulates those gases into the head space to reduce the amount of ozone needed to be generated during a second pass. To assure that the gases come in contact with all of the grain in the elevator, a technique labeled "pulling the core" is utilized wherein a quantity of grain is removed from the bottom of the elevator at its center to remove a column of grain from the core of the column of grain thereby evenly distribute the grain within the elevator. The material which is pulled from the core is then sent back to the top of the column and evenly distributed across the top. It has been found that this pulling of the core technique greatly enhances the efficiency of the ozination process.

It has been found that to assure the eradication of all insects, exposure for approximately seventy-two hours is required. Mold, bacteria and some insects will begin to die within the first twenty-four hours. Some fungal pores could require longer exposure.

DETAILED DESCRIPTION OF THE PREFERRED EMBODIMENTS

The following discussion is directed towards grain stored within a vertical elevator 10. It will be understood by those skilled in the art that the same techniques can be used for grains stored in other facilities. In one embodiment, a quantity of ozone is injected into a grain bin, vessel, or truck prior to the grain being loaded into said container in order to treat the grain for mold, bacteria, fungi, and biological load as the grain is loaded. In another embodiment, grain is delivered to the elevator by truck and is dumped into a loading bin 11 which has placed near its bottom an auger 12 which transports the grain from the loading bin to the top of the elevator 13. In this embodiment, the loading bin is partially enclosed and has injected therein a sufficient quantity of ozone to create a concentration of approximately 100 ppm within the loading bin and the enclosed auger. Because ozone not only kills insects but also tends to drive insects away, the auger and loading bin are not completely sealed, but have sufficient spaces available for insects to flee the grain as it is loaded and transported to the top of the elevator. The purpose of this initial exposure is not necessarily to kill the insects, but to drive the insects out of the grain before it is treated. Once the grain is moved by the auger into elevator 10, a large fan 14 is activated at the bottom of the elevator is to draw gases from the top of the elevator out through the bottom of the elevator. In one embodiment, ozone is introduced into the top of a container, such as said elevator, in an amount sufficient to maintain a concentration of between 50 and 200 ppm throughout the entire grain containment area of said container, which maybe reduced to 35 ppm if only mold is to be treated. These gases exit the elevator into a large duct 16 which takes the gases back to the top of the elevator before recycling. The ozination process, to achieve maximum efficiency, should occur every thirty days. As a result, this process will often occur when the elevator is full of grain.

When the elevator is full it has been discovered that to be effective in uniformly treating the grain, the central core of grain must be pulled from the elevator, removed out through the bottom of the elevator and redistributed to the top of the column of grain to evenly distribute the grain and allow for uniformed permeation of gases. Ozone generators 18 provide sufficient ozone to create a concentration of at least 100 ppm in the head space 17 in the top of elevator 13. If the ozone generators do not have a sufficient capacity to create this concentration, then the speed of the fan at the bottom of the elevator must be reduced to maintain a 100 ppm concentration of zone in the head space.

Because the ozone reacts with the biologic load on the outer surface of each grain, it takes a significant period of time before un-reacted ozone at a 50 ppm concentration passes from the head space out through the bottom of the elevator on its first pass. It has been found that this can take as many as seventy hours for the first pass. Subsequent passes take as few as two hours because of the significantly reduced biological load on the outer surface of the grain. It has been found that if the concentration is maintained for three days, that almost all insect, mold, bacteria, and fungus will be destroyed. Ozone monitors in the head space and bottom of the column verify the concentration of ozone so that the generators will create a sufficient quantity of ozone to maintain the concentration. Smell from mold and fungus disappears after 24 hours. Some insects are killed after 12 hours but complete insect eradication usually requires 72 hours.

As mentioned before, if the generators are not capable of maintaining this high concentration, the fan speed must be reduced to maintain the over 100 ppm concentration at the head space and more importantly, the 50 ppm concentration at the bottom of the column. This concentration may be reduced to 35 ppm if only mold is to be treated.

It will be appreciated by those skilled in the art that this concentration can be increased; however, the inventors have found that any reduction below 100 ppm greatly reduce the efficiency of the process.

It will also be appreciated that after the gases are recycled from the bottom of the elevator, during some of the later passes, a significant concentration of ozone still exists and the ozone generators will not be required to generate as much ozone. After the initial biological load has been destroyed, a greater concentration of ozone will remain after passing through the grain column.

After completion of the processing of the grain, the ozone generators are removed and the gases are recycled through the grain column until the ozone levels are reduced to a level where it is safe for operators to work in the vicinity of the elevator. Because ozone is highly oxidative and reacts quickly, this usually does not require a great amount of time.

We claim:

1. A process for treating grain in-situ comprising the steps:
   a) pulling a gas stream from the top of a grain containment area to the bottom of the container via a fan located at the bottom of the grain containment area;
   b) introducing ozone into the top of the container sufficient to maintain a concentration of between 35 and 200 ppm throughout the entire grain containment area, with the proviso that if the grain is being treated for other than mold only, that sufficient ozone be introduced to maintain the concentration of ozone between 50 and 200 ppm throughout said grain containment area;
   c) taking the gases from the bottom of the grain container and re-circulating those gases via a large duct back to the top of the container so that they may be reused; and
   d) monitoring the concentration of the ozone at the bottom of the containment area to maintain the concentration in the grain at a level of at least 35 ppm, if the grain is being treated for mold only, otherwise, at a level of at least 50 ppm.

2. A method as set forth in claim 1, wherein the grain in the grain containment area comprises a column of grain and the method further comprises the step of removing a quantity of grain from the center of the column of grain.

3. A method as set forth in claim 1, wherein the container comprises a grain elevator and the method further comprises injecting a quantity of ozone into a loading bin and auger of said grain elevator to drive insects from the grain prior to loading into the elevator.

4. A method as set forth in claim 1, further comprising injecting a quantity of ozone into a grain bin, vessel, or truck prior to the grain being loaded into said container in order to treat the grain for mold, bacteria, fungi, and biological load as the grain is loaded.

5. A method as set forth in claim 1, further comprising repeating the step of re-circulating until all insects are destroyed.

6. A method as set forth in claim 1, further comprising repeating the step of re-circulating until all mold is destroyed.

7. A method as set forth in claim 1, further comprising repeating the step of re-circulating for between 12 and 72 hours.

* * * * *